Nov. 26, 1929.  F. N. MASON  1,737,543
LOCKING DEVICE FOR STUFFING BOX NUTS
Filed Aug. 6, 1925
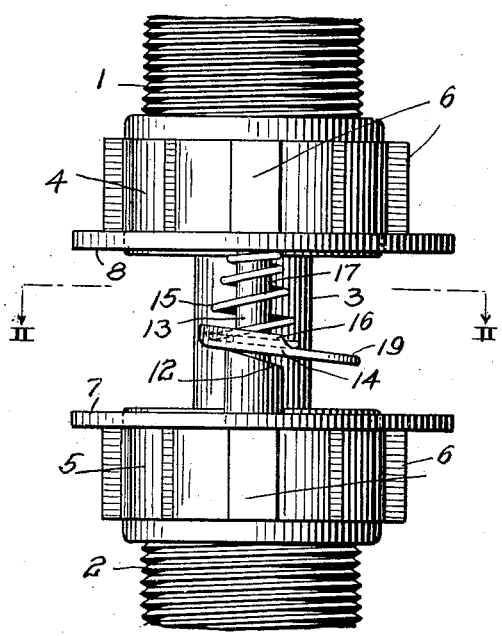
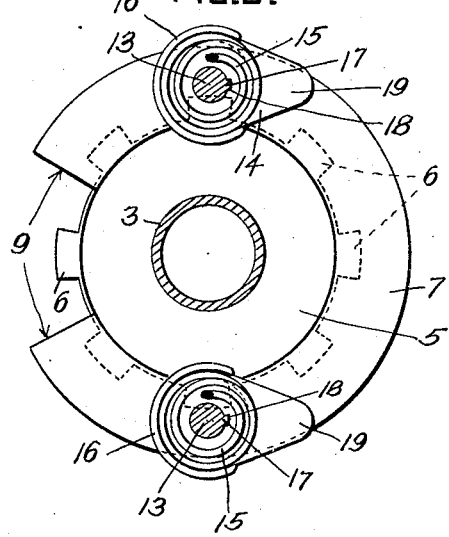
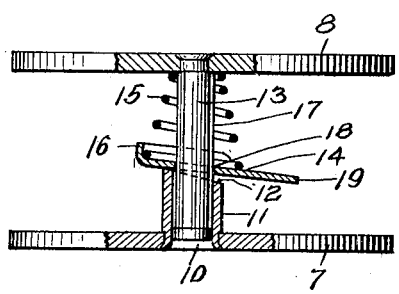
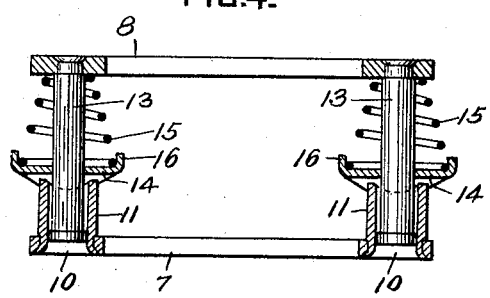
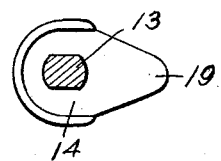
INVENTOR
Frank N. Mason.
by Edward A. Lawrence.
his attorney.

Patented Nov. 26, 1929

1,737,543

UNITED STATES PATENT OFFICE

FRANK N. MASON, OF PITTSBURGH, PENNSYLVANIA, ASSIGNOR, BY MESNE ASSIGNMENTS, TO FREDERICK SCHAEFER, OF PITTSBURGH, PENNSYLVANIA

LOCKING DEVICE FOR STUFFING-BOX NUTS

Application filed August 6, 1925. Serial No. 48,688.

For instance, in a locomotive air-pump the pistons of the steam-cylinder and the air-cylinder are mounted on a common piston rod, and thus the two stuffing boxes and their nuts are opposed.

One object which I have in view is the provision of practical means for locking opposed stuffing box nuts stationary in their adjusted positions, so as to prevent their accidental loosening and the consequent impairment of the tightness of the packing of the stuffing boxes.

Another object which I have in view is the provision of means for this purpose which may be applied to the pump or removed therefrom without any alteration in the structure of the pump and without disturbing it in any manner, and also without the use of tools.

Another object which I have in view is the provision of a locking device which will automatically accommodate itself to different adjustments of the nuts, and which will permit the nuts to be conveniently tightened or loosened without removing the locking device.

Other objects in view will appear from the following description.

For the accomplishment of these purposes, I have provided a pair of followers which are resiliently forced against the opposed nuts, and, when the nuts have been properly adjusted, the followers are automatically locked in position, so that the nuts cannot become accidentally loosened nor can the nuts be intentionally loosened until the followers are unlocked. The follower may be unlocked at will without the use of a tool, whereupon the nuts may be loosened in the usual manner.

The followers are so constructed that the locking device may be installed or removed without disturbing the pump or even halting its normal operation.

Other novel features of construction, and also of arrangement of parts, will appear from the following description.

In the accompanying drawings, wherein I have illustrated the best embodiment of my invention now known to me, Fig. 1 is a view in side elevation, showing the two stuffing boxes of a locomotive air-pump, their nuts, the common piston rod and my improved locking device applied to said nuts; Fig. 2 is a sectional view taken along the line II—II Fig. 1; Fig. 3 is a side elevation of the locking device, the same being in part broken away in section to better show parts; Fig. 4 is a diametric section of the locking device, the same being taken at right angles to Fig. 3, and Fig. 5 is a detail in section similar to Fig. 2, showing a slight modification.

Referring to the drawings, 1 represents the stuffing box of the steam-cylinder and 2 the stuffing box of the air-cylinder, while 3 is the piston rod common to both cylinders, 4 is the nut, usually termed the "spanner-nut" which is screwed onto the stuffing box 1, and 5 is the similar nut of the box 2.

The nuts 4 and 5 are shown provided with the usual exterior ribs 6 which are engaged by a spanner to move the nuts.

It is evident that said nuts are opposed and in tightening the stuffing boxes, the nuts are moved away from each other, and in loosening they move toward each other. To maintain the proper adjustment of the two stuffing boxes, and thus prevent leakage, the nuts when adjusted, should be locked against movement toward each other.

7 and 8 represent a pair of followers, which are incomplete rings preferably formed of flat metal, and whose gaps 9 are of sufficient width to provide clearance for the piston rod 3 when the locking device is being slipped into or out of its operative position.

At two or more equally spaced points one of said followers, as 7, is provided with round holes 10 in which are stepped and fixed, as by welding, the ends of the cylindrical sleeves 11 whose free ends are cut off in planes oblique to the axes of the sleeves, thus providing cam surfaces 12.

The other follower is provided with a like number of pins 13 which are of proper size to slide freely in the sleeves 11, the sleeves and pins being so positioned that when the two followers are assembled, the gaps 9 will be alined with each other.

14 are washers slidably mounted on the pins 13 and prevented from escape therefrom by the headed free ends of the pins. The washers fit loosely enough on the pins so that they may be tilted slightly relative to the pins and thus become jambed or bound against movement along the pins. The washers are resilently forced outwardly along the pins by means of helical, and preferably conical, springs 15 which are coiled about the pins, the washers being provided with arcuate lips 16 which forms seats for the ends of the springs.

The washers are prevented from rotary movement relative to the pins. Thus in Figs. 2 and 3 I show the pins provided with longitudinally disposed keys or feathers 17 which engage notches 18 in the holes in the washers through which the pins extend. In Fig. 5 I show the pins and the holes in the washers as non-circular to accomplish the same object.

It is evident that when the two followers are assembled, as shown in Fig. 4, the springs 15 tend to force the followers apart, but that when the washers are pressed against the cam surfaces 12 at the free ends of the sleeves 11, the washers are tilted relative to the pins and thus become jambed or bound on the pins until they are restored to planes at right angles, or substantially so, to the axes of the pins.

The washers are provided with laterally extending handles or gripping tongues 19 so that they may be straightened from their tilted positions by hand.

The nuts 4 and 5 are adjusted in the usual manner to properly tighten the stuffing boxes, and the locking device, assembled, as shown in Fig. 3 is then slipped into place, the gaps 9 providing clearance for slipping the device past the piston rod.

The springs will automatically force the followers 7 and 8 outwardly against the nuts 4 and 5, respectively, and the springs, by forcing the washers against the cam surfaces 12 cause the washers to assume a tilted relation to the pins, resulting in jambing the washers on the pins against movement, and thus locking the followers tightly against the nuts, thereby preventing movement of either nut as long as the locking device is in operation.

It is evident that while the locking device is in place, either or both nuts may be conveniently tightened with a spanner wrench, and the springs will automatically force the followers outwardly against the adjusted nuts, and the washers will then lock the followers in place.

If it be desired to remove the locking device from the pump, the washers are straightened and the followers slightly pressed together, and the device may then be withdrawn laterally from between the nuts.

It is apparent that my invention is adapted for advantageous use with any pump or mechanism wherein a common piston rod extends through opposed stuffing boxes.

What I desire to claim is:—

1. A locking device for a pair of opposed nuts comprising a pair of followers arranged to engage the nuts, a sleeve fixed on one of the followers and the free end of the sleeve having a surface oblique to the axis of the sleeve, a pin fixed to the other follower and slidable within said sleeve, a helical spring coiled about the pin and having its one end bearing against the corresponding follower, and a washer slidably mounted on said pin and against which the other end of said spring bears, said washer becoming jambed against movement on said pin by its engagement with the free end of the sleeve.

2. A locking device for opposed nuts comprising a pair of followers arranged to engage the nuts, a pair of sleeves fixed on one of the followers and positioned in diametrically opposed relation, the free ends of said sleeves having surfaces oblique to the axes of the sleeves, a pair of pins fixed to the other follower and slidable in said sleeves, helical springs coiled about the pins and having their one ends bearing against the corresponding follower, and washers slidably mounted on said pins and against which the other ends of said springs bear, the washers becoming jambed against movement on their pins by their engagement with the oblique ends of the sleeves.

Signed at Pittsburgh, Pa., this 5th day of August, 1925.

FRANK N. MASON.